(12) United States Patent
Bartels et al.

(10) Patent No.: US 6,907,847 B2
(45) Date of Patent: Jun. 21, 2005

(54) BALL-JOINT MOUNTING FOR A WATER LANCE OF A WATER LANCE BLOWER

(75) Inventors: Franz Bartels, Hamminkeln (DE); Klaus Eimer, Ratingen (DE); Stephan Simon, Hamminkeln (DE)

(73) Assignee: Clyde Bergemann GmbH, Wesel (DE)

( * ) Notice: Subject to any disclaimer, the term of this patent is extended or adjusted under 35 U.S.C. 154(b) by 0 days.

(21) Appl. No.: 10/386,333

(22) Filed: Mar. 11, 2003

(65) Prior Publication Data

US 2004/0052573 A1 Mar. 18, 2004

Related U.S. Application Data

(63) Continuation of application No. PCT/EP01/10328, filed on Sep. 7, 2001.

(30) Foreign Application Priority Data

Sep. 11, 2000 (DE) .......................................... 100 44 799

(51) Int. Cl.[7] ................................................. F28G 3/00
(52) U.S. Cl. ...................... 122/379; 122/390; 15/316.1; 134/167 R
(58) Field of Search ................................. 122/379, 390; 15/316.1; 134/167 R, 172, 198

(56) References Cited

U.S. PATENT DOCUMENTS

| | | | |
|---|---|---|---|
| 1,599,283 A | 9/1926 | Phillips | |
| 1,807,457 A | 5/1931 | Weis | |
| 2,972,502 A | 2/1961 | Jennings et al. | |
| 3,604,088 A | 9/1971 | Turner | |
| 6,035,811 A | 3/2000 | Bude et al. | |
| 6,073,641 A | 6/2000 | Bude et al. | |
| 6,101,985 A | 8/2000 | Bude et al. | |
| 6,581,549 B2 * | 6/2003 | Stewart et al. | 122/379 |

FOREIGN PATENT DOCUMENTS

| | | |
|---|---|---|
| DE | 2 261 382 | 6/1974 |
| DE | 145 476 | 12/1980 |
| DE | 276 908 A1 | 3/1990 |
| WO | WO 93/12398 | 6/1993 |
| WO | WO 96/38701 | 12/1996 |
| WO | WO 96/38702 | 12/1996 |
| WO | WO 96/38703 | 12/1996 |
| WO | WO 96/38704 | 12/1996 |

* cited by examiner

Primary Examiner—Gregory A. Wilson
(74) Attorney, Agent, or Firm—Laurence A. Greenberg; Werner H. Stemer; Ralph E. Locher

(57) ABSTRACT

A bearing system for a water lance of a water lance blower contains a ball joint having a ball with a surface and a diameter. The ball further has a passage, on and/or in which the water lance can be disposed. The bearing system is characterized in that a ball seat is provided and contains two axially interspaced bearing shells each of which has an opening, whereby the ball protrudes at least partially into the openings. A method for operating the bearing system that seals gaps, which can occur as the ball rotates, between the surface of the ball and the spherical contact surface of the at least one bearing shell. The bearing shells enable the bearing system to be easily assembled, and the small contact surfaces reduce the amount of friction during operation. In addition, the bearing system is also suited for use as a seal.

30 Claims, 4 Drawing Sheets

US 6,907,847 B2

BALL-JOINT MOUNTING FOR A WATER LANCE OF A WATER LANCE BLOWER

CROSS-REFERENCE TO RELATED APPLICATION

This application is a continuation of copending International Application No. PCT/EP01/10328, filed Sep. 7, 2001, which designated the United States and was not published in English.

BACKGROUND OF THE INVENTION

Field of the Invention

The present invention relates to a bearing system for a water lance of a water lance blower with a ball joint which contains a ball and a ball seat, the ball having a through-passage, on and/or in which it is possible to dispose the water lance. The present invention also relates to a method of operating the bearing system.

Water lance blowers are used, in particular, for cleaning thermal installations. Water lance blowers of this type are described, for example, in International Patent Disclosures WO 96/38701 (corresponding to U.S. Pat. No. 6,035,811), WO 96/38702 (corresponding to U.S. Pat. No. 6,073,641), WO 96/38703 (corresponding to U.S. Pat. No. 6,035,811) and WO 96/38704 (corresponding to U.S. Pat. No. 6,101,985). The water lance blowers here discharge a concentrated water jet through the combustion chamber onto the opposite wall. As a result of the kinetic water-jet energy and of the sudden evaporation of water that has penetrated into pores of the deposits, the contamination containing soot, slag and ash is caused to flake off.

For this purpose, the water lance blowers have a water lance which has its mouth opening disposed in a pivotable manner on or in a hatch of the thermal installation. The impact region of the water jet produced by the water lance blower generally follows a certain predeterminable path on the surface which is to be cleaned, also referred to as a blowing pattern. This path preferably runs in a meandering manner and bypasses possible obstructions, openings or other sensitive zones. The movement of the water lance is realized by a drive system, the latter having, in particular, sensors for monitoring the movement sequences of the water lance integrated in it.

For a precise control of the movement sequences of the water lance, a suitable, pivotable mounting for the water lance is necessary. A mounting for a water lance is known from International Patent Disclosure WO 93/12398, the water lance being connected, in the vicinity of its mouth opening, to a segment of a universal joint. The universal joint is disposed in the wall of the thermal installation. On account of the universal joint, the hatch or opening in the wall of the thermal installation is not completely closed. Such thermal installations are preferably operated at positive pressure, smoke, ash and waste gases passing outward through the hatch or the joint. This is undesirable since these hot products of the combustion process may shorten the service life of the water lance blower or place the operating staff at risk.

Furthermore, East German Patent: DD 145 476 B discloses the practice of mounting the water lance in a ball joint. Mountings with both single-sided and double-sided action are described here. If the ball bearing is only suitable for absorbing axial forces in one direction (single-sided bearing), the water lance has to be pushed into the mounting on a permanent basis. For this purpose, the water lance is connected to a thermal installation via springs. Such a mounting, on account of pressure fluctuations in the interior of the thermal installation, may result in undesirable movement sequences of the water lance. The double-sided action mounting described in DD 145 476 B requires the ball-bearing guide to be divided horizontally in order for it to be possible to insert the water lance in the joint, rendering assembly and maintenance more difficult. Furthermore, it is possible for the sliding surfaces of the ball joint to close as a result of the ingress of contaminants and for the service life of the ball bearing to be reduced.

A further mounting for a water lance is described in East German Patent Application DD 276 908 A. The water lance here is provided with a tube that is subjected to the action of a coolant and/or a blowing agent. The tube is connected, via through-openings, to through-passage openings introduced in the ball joint, and is incorporated in an air-chamber gap, which is disposed between the ball-joint segment and ball-joint guide and is open in the direction of the outlet of the tube. Integrating the cooling system for the ball joint in the water lance itself results in the water lance having to have a plurality of separate supply lines with different media. The construction of the water lance is very complex here. This results in the weight of the water lance increasing, and this detracts from the movement behavior. In addition, it is necessary for the ball-joint guide to be divided horizontally in order for the ball joint to be inserted or exchanged.

East German Patent Application DD 276 908 A also describes a method of cooling the ball joint and the water lance. Cooling air flows via an annular channel, on the one hand, to the mouth opening of the water lance and, on the other hand, into an air-chamber gap between the ball-joint segment and ball-joint guide.

SUMMARY OF THE INVENTION

It is accordingly an object of the invention to provide a ball-joint mounting for a water lance of a water lance blower that overcomes the above-mentioned disadvantages of the prior art devices and methods of this general type, which is of straightforward construction and is easy to assemble and ensures precise movement of the water lance. The invention also specifies a method of operating the bearing system that at least considerably reduces contamination in the bearing gap.

With the foregoing and other objects in view there is provided, in accordance with the invention, a bearing system for a water lance of a water lance blower. The bearing system contains a ball joint having a ball with a surface, a diameter, and a through-passage. The water lance is disposed on and/or received in the through-passage. A ball seat is provided and has two bearing shells spaced apart axially from one another and has openings formed therein. The ball projects, at least in part, into the openings of the two bearing shells.

The bearing system with the ball joint according to the invention contains the ball and the ball seat, the ball having a through-passage, on and/or in which it is possible to dispose the water lance. The ball seat contains two bearing shells which are spaced apart axially from one another and each have an opening, the ball projecting, at least in part, into the openings. The bearing shells here are oriented such that they can absorb axial forces in both directions. The ball is thus fixed axially, rotation of the ball in the openings of the bearing shells being ensured at the same time. The difference in the configuration of the water lance relates to whether the water lance extends, at least in part, into the through-passage and is connected directly to the latter or whether the water lance is only disposed indirectly on the through-passage. Such an indirect configuration is provided, in particular, when the water lance is fixed in the through-passage with additional components. These may have, for example, adaptive or sealing functions.

Such a configuration of the bearing system has the advantage that, for the purpose of exchanging, maintaining or checking the ball joint, all that is required is for one (easily accessible) bearing shell to be removed. Since the bearing shells are spaced apart from one another, use-specific absorption of axial forces is possible, the amount of friction and thus also the heat produced during rotation being reduced. If, for example, high axial forces occur, the ball seat has smaller openings, as a result of which the axial fixing of the ball joint is configured in a more stable manner. An increase in size of the abutment surface of the ball and the ball seat according to the invention, nevertheless, may be avoided by, for example, the spacing between the bearing shells being increased.

It is particularly advantageous for the bearing shells to be disposed symmetrically in relation to a surface perpendicular to the axis of the ball joint. The bearing shells may thus be of identical configuration, as a result of which the production of such a bearing system is simplified. During assembly, the bearing shells are then disposed in an oppositely directed manner to form the ball seat.

According to a further configuration of the bearing system, the bearing shells each have a spherical abutment surface with a maximum and a minimum shell diameter, these butting, at least in part, against the surface of the ball. A spherical abutment surface is intended to mean, in principle, a three-dimensional surface, in particular concave or convex surfaces, although it is also to be understood as covering a concave or convex surface with interruptions. These interruptions may be used, for example, for lubricating or cooling the mounting, in which case the friction is reduced in addition.

The spherical abutment surfaces here are preferably formed as negative of the ball surface. It is particularly advantageous here if these spherical abutment surfaces correspond to a band-like section around the surface of the ball. Since the bearing shells are suitable for absorbing axial forces, the ball abuts from the side with the maximum shell diameter. On account of production tolerances, the abutment surface usually only ends up butting partially against the surface of the ball, very good guidance of the ball being ensured nevertheless.

According to a further configuration of the bearing system, the bearing shells are connected to one another. This makes it possible to fix the configuration of the bearing shells precisely in relation to one another, as a result of which permanent and smooth-running guidance of the ball is ensured.

It is particularly advantageous if at least one bearing shell is connected to at least one spring element such that the latter pushes at least one bearing shell onto the ball. It is possible here for the spring element to be disposed, on the one hand, between the bearing shells or, on the other hand, between a fastening device and the bearing shell. The first configuration is particularly suitable in order to compensate for expansions of the connecting device as occur, for example, on account of the high temperatures in the vicinity of a thermal installation. In the other case, the at least one spring element is utilized to produce a force in the direction of the other bearing shell. In this way, it is ensured, even in the case of highly dynamic movements of the ball as may occur, for example, as a result of pressure fluctuations in the thermal installation or abrupt changes in movement of the water lance, that the ball is guided on the spherical abutment surface of at least one bearing shell.

According to yet a further configuration of the bearing system, the bearing shell is connected to a securing device (housing), in particular made of a heat-resistant material. The securing device is preferably made of a heat-resistant steel material. This allows the bearing system according to the invention to be combined particularly straightforwardly with different thermal installations, the securing device possibly having supply lines for external systems (sensor-based monitoring system, coolant supply, blocking-air supply, lubricant supply, etc.).

According to an advantageous development of the invention, the ball has a diameter of from 110 to 200 mm, in particular of from 130 mm to 160 mm. The diameter of the ball is to be adapted, in particular, to the diameter of the through-passage and the predeterminable pivoting range of the water lance. A diameter of the ball in the range specified allows a conical pivoting range of 45° about the axis of the ball joint in the case of a through-passage diameter of approximately 40 mm, this avoiding jamming of the ball as may occur, for example, if the bearing shells are insufficiently spaced apart.

According to a further configuration, at least a sub-surface of the surface of the ball is made of a ceramic material, in particular aluminum oxide. The ceramic material is distinguished by its particular hardness. This ensures a high service life for the mounting since contaminants are ground down, if appropriate, by the mounting itself. It may be sufficient here for that sub-surface of the surface of the ball that comes into abutment against the bearing shells during operation to be coated with the ceramic material.

It is particularly advantageous if the ball is formed from the ceramic material, in particular from injection-molded ceramic material. Configuring the entire ball from ceramic material has the advantage that this ensures uniform thermal expansion behavior of the ball. If the ball is produced by the injection molding of ceramic material, it is divided in two. This has the advantage that a very lightweight ball with very thin uniform walls is formed. It is possible here, if appropriate, for the operation of joining the ball halves to be dispensed with since the ball is held together by the bearing shells.

According to yet a further configuration, the bearing shells bound an annular gap which encircles the ball and into which an air stream can be introduced. The bearing shells thus do not have any interruptions, with the result that the annular gap is formed by the two spaced-apart bearing shells and the abutting ball. With ideal mounting, it is thus not possible for an air stream introduced into the annular gap to escape between the bearing shells and the ball; rather the air stream produces an increased pressure in the annular gap. If, on account of particular dynamic loading, the spherical abutment surface of the bearing shell ends up being raised off from the surface of the ball, it is possible for the air stream to escape at these locations and thus prevent contaminants from penetrating into the mounting.

According to a further configuration, the ball has at least one, preferably radially running channel that extends from the surface in the direction of the through-passage. Such a channel is suitable, in particular, for advancing into the interior of the ball an air stream that is introduced into the annular gap. In this way, it is possible to cool a water lance that is fastened in and/or on the through-passage. The air-stream supply here should be such that uniform cooling is ensured in any desired position of the water lance. A number of radially formed channels distributed uniformly over the surface of the ball allows cost-effective production and uniform cooling.

It is particularly advantageous for the channels to be disposed in a common plane. The configuration of a plurality of channels in a single plane has, for example, the advantage that the ball can be produced in two parts, the individual channels being formed by grooves. It is particularly preferred here for the channels to be disposed in a plane which, rather than running through the center point of the ball is displaced perpendicularly thereto in the direction of the side of the combustion chamber. Therefore, a smaller number of channels open out into the surroundings in the vicinity of the maximum pivoting range. It is nevertheless ensured that at least one channel crosses the annular gap in each position of the ball. This ensures that the through-passage is supplied with cooling air on a permanent basis.

According to yet a further configuration, the through-passage has at least one cross-sectional widening with a predeterminable length, this being connected to at least one channel, preferably all the channels. The cross-sectional widening is preferably disposed centrally in the interior of the ball and serves for vortexing and/or distributing the air stream flowing in. If, then, for example the mouth opening of a water lance is disposed in the through-passage, the cross-sectional widening forms an annular cavity around the water lance. On account of the different positions of the ball, the air stream is introduced in each case through a different number of channels. The annular cavity ensures that a possibly partially introduced air stream is vortexed and distributed uniformly around the water lance.

It is particularly advantageous if the at least one channel has a valve. Such a valve prevents, for example, the air stream introduced from being discharged into exterior surroundings of the ball joint and, in particular, into the exterior of the thermal installation. This makes it possible to reduce the cooling-air-stream quantity. In the case of thermal installations that operate at a positive pressure, it is thus possible to prevent the situation where, in certain positions of the ball, smoke or other contaminants penetrate into the ball joint through the channels directed into the interior of the thermal installation.

According to a further exemplary embodiment, the through-passage has an outlet opening, the through-passage having at least one widened portion that is adjacent to the outlet opening and has a predeterminable depth. The widened portion is configured such that it is connected in terms of flow to the at least one channel. This is intended to mean that, if appropriate, a gas, in particular an air stream, from the at least one channel can be introduced, at least in part, into the widened portion. As a result, a water lance that may be disposed in the through-passage can be cooled not just over the length of the cross-sectional widening, but also as far as the outlet opening. This ensures an air stream from the annular gap into the interior of the ball via the channels, the air stream then flowing past the mouth opening of a water lance outside and, at the outlet opening, flowing out into the interior of the thermal installation. If the air stream has a higher pressure in the channel, the cross-sectional widening or the widened portion than in the thermal installation, uniform cooling is achieved and the interior of the ball joint is protected against contamination. The widened portion preferably has, in addition, radially inwardly directed ribs that serve as a kind of guide for the mouth opening of the water lance. The spaces between the ribs ensure cooling.

According to yet a further configuration of the bearing system, the through-passage has an inlet opening, the through-passage having at least one cutout in the vicinity of the inlet opening. The cutout serves, in particular, for fastening the water lance. It is thus possible for the ball and water lance to be connected, for example, in a form-fitting or force-fitting manner. Such connections are easy to release and are very suitable for maintenance purposes.

According to yet a further exemplary embodiment, an adapter for fixing the water lance is disposed in and/or on the through-passage, in particular in the vicinity of the inlet opening. The adapter makes it possible for the already installed water lance blowers to be combined with the bearing system according to the invention, since there is thus no need for a specific nozzle form of the water lance for fixing on the bearing system. For particularly stable fixing of the water lance, the adapter extends preferably into the through-passage, in particular through the entire through-passage. It is likewise possible here for the adapter to be configured such that uniform cooling of the water lance and/or the adapter is brought about by corresponding narrowing of the adapter.

According to yet a further configuration, the through-passage has at least one pivoting range of 45° about the axis of the ball joint. The pivoting range here is an imaginary, three-dimensional, spherical space that originates at the center point of the ball and has a minimum opening angle of 45°. The water lance can be pivoted in the pivoting range in order to execute its precise movements. In particular in the case of the configuration of the widened portion and/or of the cutout and/or the adapter, it is always ensured that the pivoting range is not restricted.

The method of operating the bearing system according to the invention relates in that the annular gap is provided with a gaseous medium, preferably an air stream, of which the pressure is greater than the ambient pressure of the ball joint. In the case of different ambient pressures inside and outside the thermal installation, the pressure in the annular gap is to be geared to the greater ambient pressure. The pressure-generating gaseous medium may preferably be introduced into the annular gap via a suitable infeed in or on the housing. The ball joint is thus sealed in relation to the surroundings.

On account of production tolerances and/or the dynamic loading of the bearing, it is possible for gaps to be produced between the abutment surfaces of the bearing shells and the surface of the ball. With a corresponding pressure in the annular gap, the gaseous medium, in particular air, flows through the gaps into the surroundings. This prevents, for example, particles of soot or ash from collecting between the abutment surface of the bearing shell and the surface of the ball. The medium that has flowed out is to be continuously replenished in order for the desired pressure to be maintained.

According to a further configuration of the method, at least when the through-passage is oriented axially, in particular within a pivoting range of 20°, all the channel openings open out into the annular gap. The water lance blower is usually only operated for brief periods (a few minutes), whereas it spends much of the time in the rest position. An axial or only slightly inclined orientation of the through-passage is used, in particular, while the water lance is in this rest position. Since there is no water flowing through the water lance during this period of time, the cooling of the water lance with the aid of the air stream is particularly important. For this reason, it is advantageous for the air stream to be introduced uniformly from the annular channel, through all the channels. A slightly downwardly inclined water lance, furthermore, has the advantage that residual water or contaminants pass out of the water lance on account of the gravitational force.

According to yet a further configuration of the method, with any desired orientation of the through-passage, at least one channel opening opens out, at least in part, into the annular gap. Any desired orientation of the through-passage here is intended to mean any position within the predetermined pivoting range. This ensures that the water lance disposed in the through-passage is continuously supplied with cooling air during the operation of the water lance blower.

According to a further configuration of the method, the air stream flows into a cross-sectional widening through at least one channel opening disposed in the annular gap and passes out, at least in part, through channels which do not open out into the annular gap and/or through at least one widened portion. The air stream is introduced into the interior of the ball via the annular gap and the channel openings. The cross-sectional widening forms, with a water lance disposed in the through-passage, an annular cavity in which the air stream introduced is vortexed and distributed. Proceeding from this annular cavity, for example some of the air stream flows through the channels that do not open out into the annular gap, as a result of which the channels are sealed against contamination from the surroundings. An air stream occurring through the widened portion cools the water lance and assists the concentration of the water jet.

Other features which are considered as characteristic for the invention are set forth in the appended claims.

Although the invention is illustrated and described herein as embodied in a ball-joint mounting for a water lance of a water lance blower, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
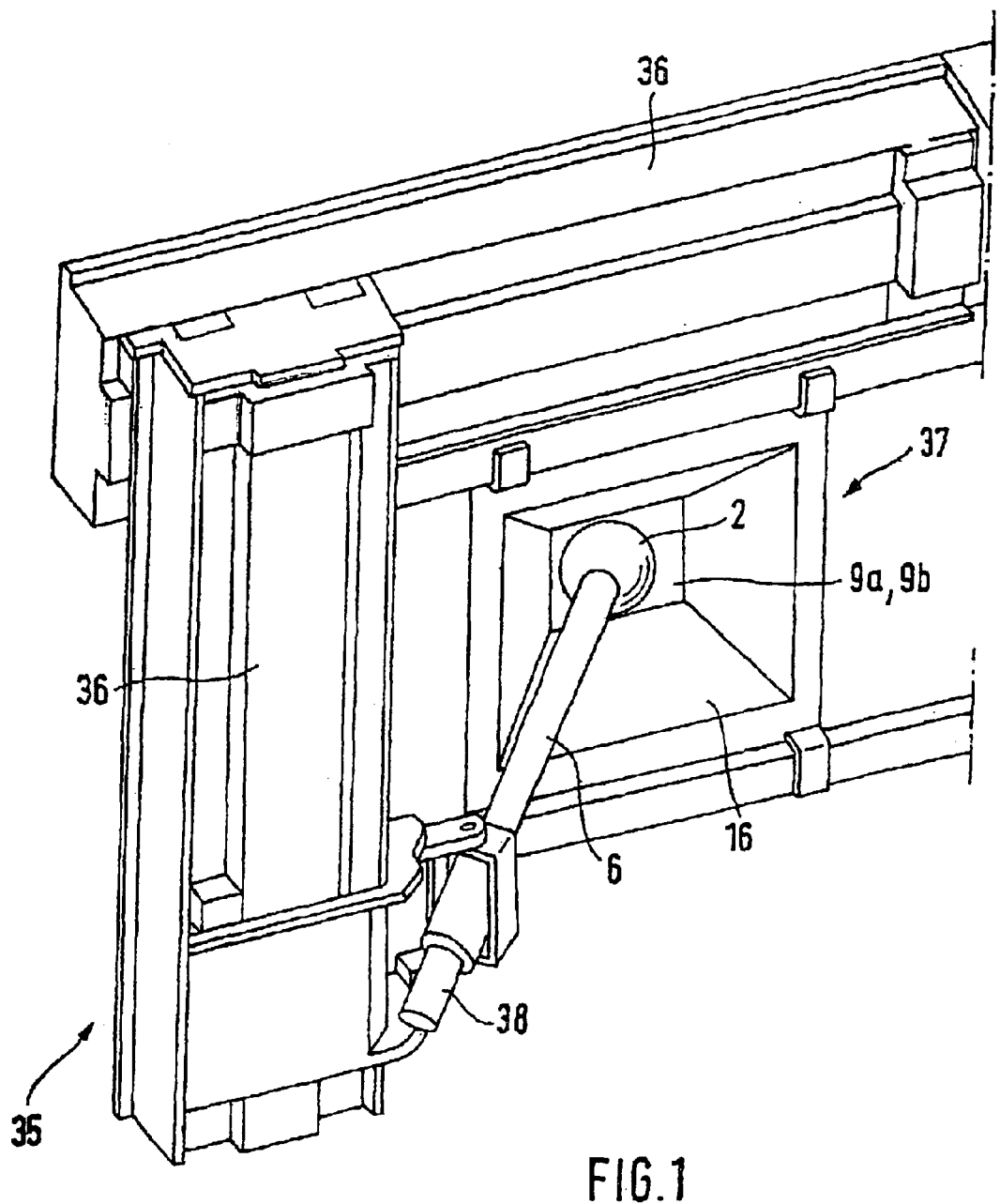
FIG. 1 is a diagrammatic, partial perspective view of a water lance blower with a bearing system according to the invention.

Referring now to the figures of the drawing in detail and first, particularly, to FIG. 1 thereof, there is shown schematically, the construction of a water lance blower 35 with two drive units 36 which ensure that a water lance 6 moves precisely in accordance with predeterminable blowing patterns. The water lance 6 is articulated, at its rear end 38, on one drive unit 36 and opens out into a ball 2 according to the invention, which is mounted and guided in bearing shells 9a, 9b. A ball joint 1 is disposed in a housing 16 that is fastened in a hatch 37 of a thermal installation. At the rear end 38, the water lance 6 is fed water, which is sprayed through the ball 2, for example, onto inner wall regions of a thermal installation.

Figure 2:
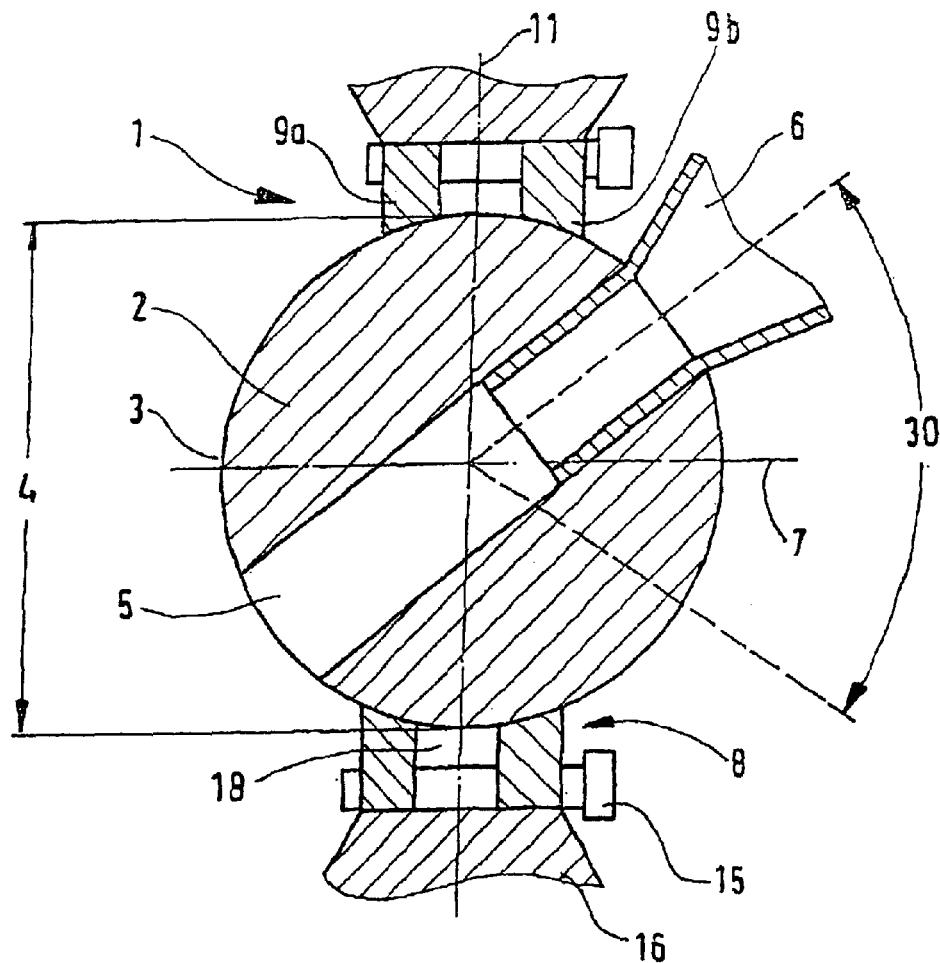
FIG. 2 is a sectional view of one embodiment of the bearing system.

FIG. 2 shows a schematic sectional view of the ball joint 1 according to the invention. The ball joint 1 has an axis 7 and contains the ball 2 and a ball seat 8. The ball seat 8 contains the two bearing shells 9a, 9b which are spaced apart axially 7 from one another and each have an opening 10a, 10b, the ball 2 projecting, at least in part, into the openings 10a, 10b. The bearing shells 9a and 9b butt against a surface 3 of the ball 2 and thus bound an encircling annular gap 18. They are connected to one another by spring elements 15 and are disposed in a housing 16. The ball 2, furthermore, is configured with a through-passage 5, in which the water lance 6 is disposed. A diameter 4 of the water lance 6 is selected such that the water lance 6 can be moved freely within a pivoting range 30. The bearing shells 9a and 9b are disposed symmetrically in relation to a surface 11 perpendicular to the axis 7 and are suitable for absorbing forces axially.

Figure 3:
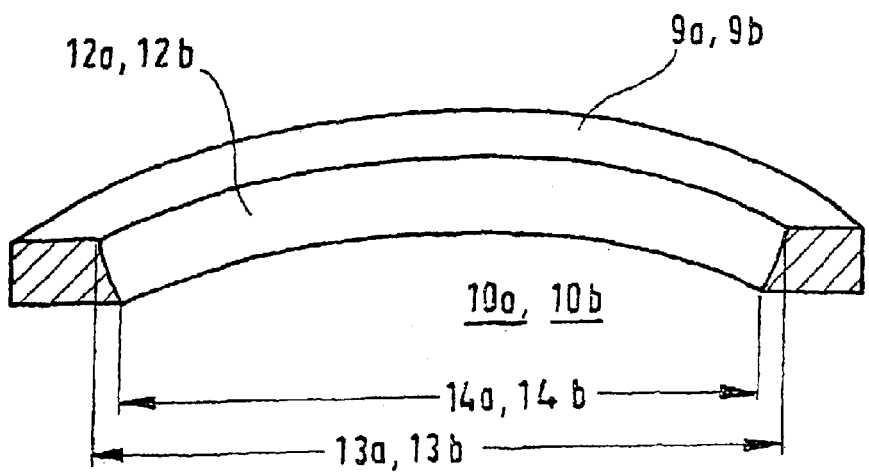
FIG. 3 is a partial, perspective view of part of a bearing shell.

FIG. 3 shows, schematically and in perspective, a sectional view of the bearing shell 9a, 9b. The latter has the opening 10a, 10b and a spherical abutment surface 12a, 12b. The ball 2 projects, at least in part, through the opening 10a, 10b and butts, at least in part, against the abutment surface 12a, 12b. In order for the bearing shell 9a, 9b to be suitable for absorbing forces axially 7, it has a maximum 13a, 13b and a minimum 14a, 14b shell diameter.

Figure 4:
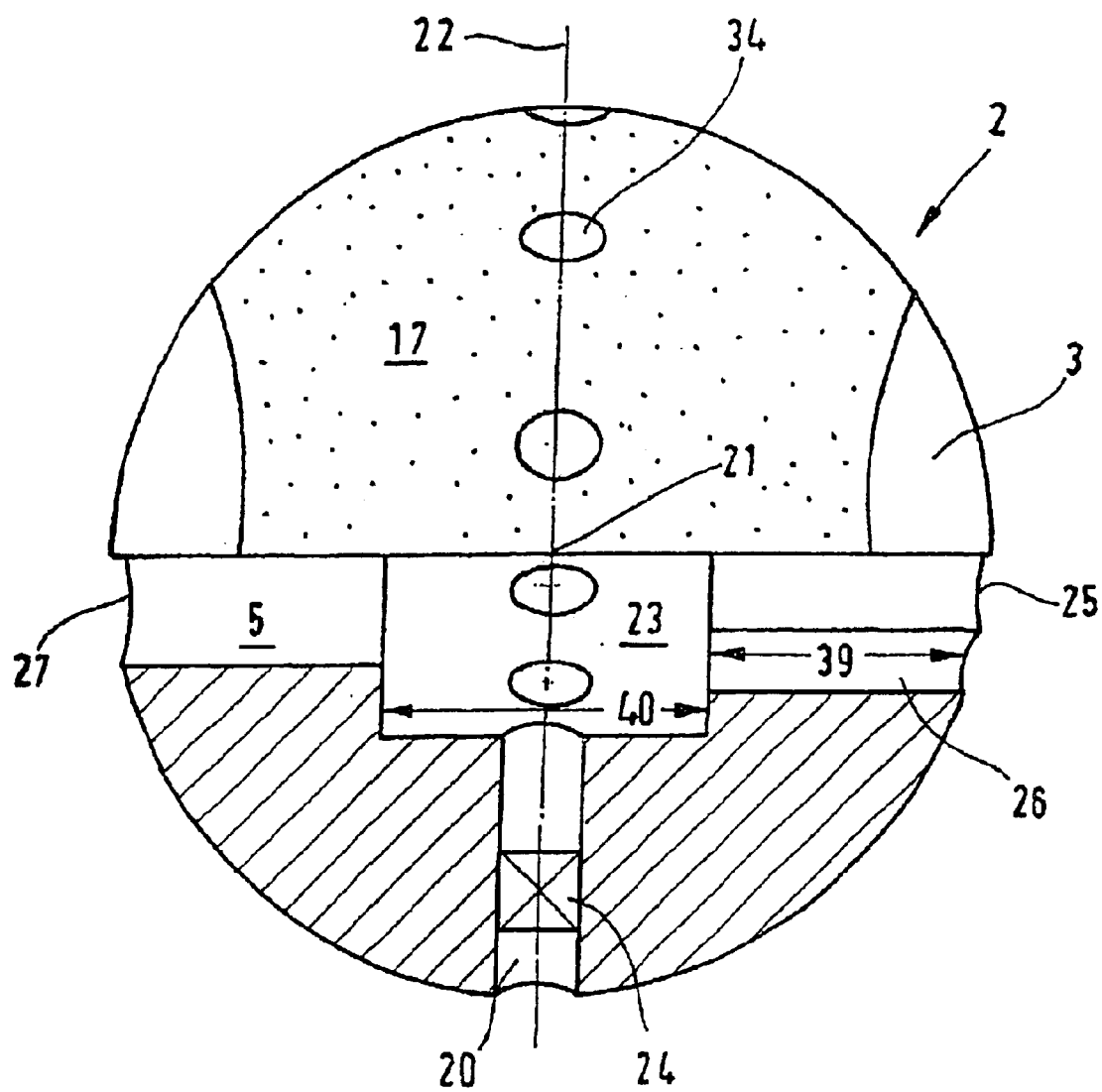
FIG. 4 is an illustration of a ball for one embodiment of the bearing system, a perspective illustration being shown in the top region and a sectional illustration being shown in the bottom region.

FIG. 4 shows the ball 2 according to the invention, a perspective illustration being shown in the top region and a sectional illustration being shown in the bottom region. The surface 3 of the ball 2 has a sub-surface 17 which is formed of a ceramic material. The configuration of the sub-surface 17 is selected such that, in each position of the ball 2, the bearing shells 9a, 9b merely butt against the sub-surface 17. The ball 2 has a plurality of channels 20 with channel openings 34 which are disposed in a plane 22 through a center point 21. Valves 24 are disposed in the channels 20 in order to prevent gases or particles from flowing out or in. All the channels 20 open out into a cross-sectional widening 23, which extends over a length 40 of the through-passage 5. The channel likewise runs through the center point 21 and has an inlet opening 27 for fixing the water lance 6 and an outlet opening 25 that is oriented in the direction of the interior of a thermal installation. The through-passage 5 has a widened portion 26 that is adjacent to the surface 3 of the ball 2 and has a predeterminable depth 39. The embodiment illustrated is one in which the depth 39 of the widened portion 26 has been selected such that the latter is also adjacent to the cross-sectional widening 23.

Figure 5:
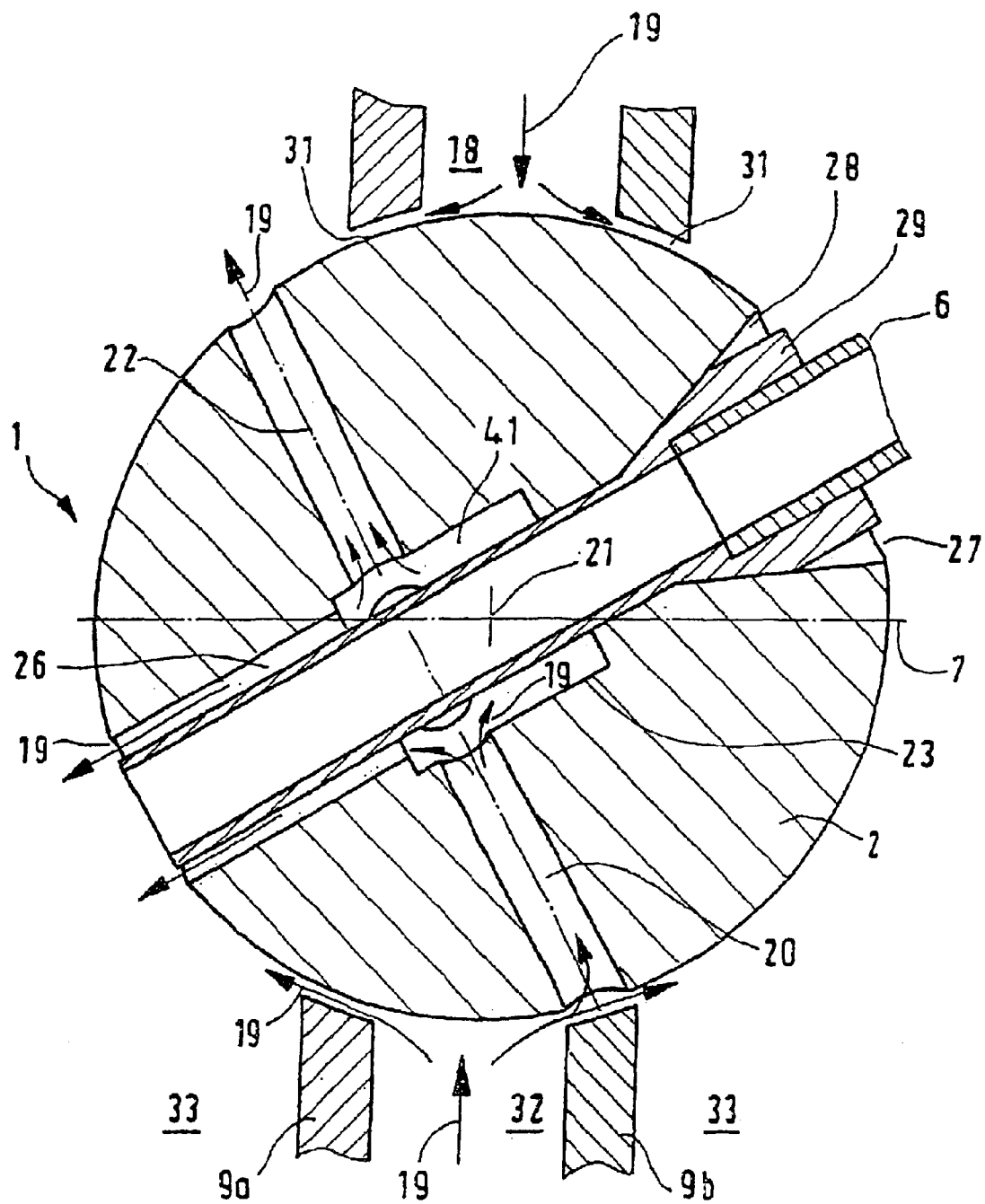
FIG. 5 is a sectional view of a further embodiment of the bearing system.

FIG. 5 shows a further configuration of the ball joint 1 according to the invention. The ball 2 is guided by the two bearing shells 9a, 9b which are spaced apart axially 7. The bearing shells 9a and 9b bound an annular gap 18 into which an air stream 19 (arrows) can be introduced. Therefore a pressure 32 prevailing in the annular gap 18 is greater than the ambient pressure 33 of the ball joint 1. If gaps 31 appear between the bearing shells 9a, 9b and the ball 2 during operation of the bearing system, then air 19 flows, at least in part, through gaps 31 and thus prevents contamination of the bearing system. The air stream 19 is introduced, at least in part, into the cross-sectional widening 23 of the through-passage 5 through the channels 20 which open out into the annular gap 18. An adapter 29 for accommodating the water lance 6 is disposed in the through-passage 5. The adapter 29 is fastened and fixed to the ball 2 by way of a cutout 28 in the vicinity of the inlet opening 27 of the through-passage 5. The adapter 29 extends all the way through the through-passage 5 as far as the outlet opening 25. This makes it possible to realize a uniform water jet. A cavity 41 is formed by the adapter 29 and the cross-sectional widening 23, and the air 19 introduced is vortexed in the cavity 41. It then flows out, at least in part, through the channels 20 which do not open out into the annular gap 18. Contamination of the channels 20 is thus prevented. In addition, the air stream 19 flows, at least in part, through the widened portions 26 and thus ensures sufficient air-cooling of the adapter 29. The channels 20 are disposed in a plane 22 that does not pass through the center point 21. In this way, only a small number of the channels 20 open out into the surroundings outside the thermal installation, as a result of which a lesser air stream 19 is required for cooling and/or sealing purposes.

The bearing system with the ball joint 1 according to the invention allows straightforward assembly of the bearing system, the configuration of the abutment surfaces reducing the friction during the operation of the bearing system. With the bearing system being correspondingly supplied with an air stream, it is possible for it to be sealed, for example, against particles of ash and soot.

We claim:

1. A bearing system for a water lance of a water lance blower, the bearing system comprising:
   a ball joint containing:
      a ball having a surface, a diameter, and a through-passage formed therein, the water lance being at least one of disposed on and received in said through-passage; and
      a ball seat having two bearing shells spaced apart axially from one another and having openings formed therein, said ball projecting, at least in part, into said openings of said two bearing shells.

2. The bearing system according to claim 1, wherein said two bearing shells each have a spherical abutment surface with a maximum and a minimum shell diameter, said spherical abutment surface butting, at least in part, against said surface of said ball.

3. The bearing system according to claim 1, wherein said bearing shells are connected to one another.

4. The bearing system according to claim 3, further comprising at least one spring element, and at least one of said two bearing shells being connected to said spring element such that said spring element pushes said at least one bearing shell onto said ball.

5. The bearing system according to claim 4, further comprising a securing device, and at least one of said two bearing shells is connected to said securing device.

6. The bearing system according to claim 5, wherein said securing device is made of a heat-resistant material.

7. The bearing system according to claim 1, wherein said diameter of said ball is from 110 mm to 200 mm.

8. The bearing system according to claim 1, wherein said surface has at least a sub-surface formed from a ceramic material.

9. The bearing system according to claim 8, wherein said ball is formed from a ceramic material.

10. The bearing system according to claim 8, wherein said ball is formed from an injection-molded ceramic material.

11. The bearing system according to claim 1, wherein said two bearing shells bound an annular gap which encircles said ball and into which an air stream can be introduced.

12. The bearing system according to claim 11, wherein said ball has at least one channel formed therein and extends from said surface in a direction of said through-passage.

13. The bearing system according to claim 12, wherein said channel is one of a plurality of radially running channels disposed in a common plane.

14. The bearing system according to claim 13, wherein said through-passage has at least one cross-sectional widening with a predeterminable length, said cross-sectional widening connected to at least one of said channels.

15. The bearing system according to claim 14, wherein said through-passage has an outlet opening and at least one widened portion adjacent to said outlet opening, said widened portion having a predeterminable depth and connected in terms of flow to said channel.

16. A method of operating a bearing system, which comprises the steps of:
    providing the bearing system according to claim 15;
    providing the annular gap with a gaseous medium having a given pressure greater than an ambient pressure around the ball joint.

17. The method according to claim 16, which further comprises using an air stream as the gaseous medium.

18. The method according to claim 17, which further comprises flowing the air stream into the cross-sectional widening from at least one of the radially running channels having a channel opening fluidically communicating with the annular gap, the air stream passes out, at least in part, through other ones of said plurality of radially running channels having channel openings which do not open out into the annular gap and through the at least one widened portion.

19. The method according to claim 16, which further comprises orienting the through-passage axially and within a pivoting range of 20° resulting in all channel openings of all the radially running channels opening out into the annular gap.

20. The method according to claim 16, which further comprises orienting the ball having the plurality of radially running channels such that in any desired orientation of the through-passage, at least one channel opening of the radially running channels opens out, at least in part, into the annular gap.

21. The bearing system according to claim 14, wherein said plurality of radially running channels each have a channel opening, and in a case of which, with any desired orientation of said through-passage, at least one said channel opening opens out, at least in part, into the annular gap.

22. The bearing system according to claim 13, wherein said through-passage has at least one cross-sectional widening with a predeterminable length, said cross-sectional widening connected to all of said radially running channels.

23. The bearing system according to claim 12, further comprising a valve disposed in said channel.

24. The bearing system according to claim 12, wherein said channel is a radially running channel.

25. The bearing system according to claim 1, wherein said through-passage has an inlet opening and at least one cutout in a vicinity of said inlet opening.

26. The bearing system according to claim 1, further comprising an adapter for securing the water lance, said adapter disposed at least one of in and on said through-passage.

27. The bearing system according to claim 26, wherein said through-passage has an inlet opening and said adapter is disposed in a vicinity of said inlet opening.

28. The bearing system according to claim 1, wherein said ball joint has a given axis and said through-passage has at least one pivoting range of 45° about said given axis.

29. The bearing system according to claim 1, wherein said diameter of said ball is from 130 mm to 160 mm.

30. The bearing system according to claim 1, wherein said surface has at least a sub-surface formed from aluminum oxide.

* * * * *